May 19, 1936.   G. E. McLAUGHLIN   2,041,080
MACHINE FOR OPERATING UPON SHEET MATERIAL
Filed Dec. 11, 1933   12 Sheets-Sheet 1

Inventor
George E. McLaughlin
By his Attorney
Harlow M. Davis

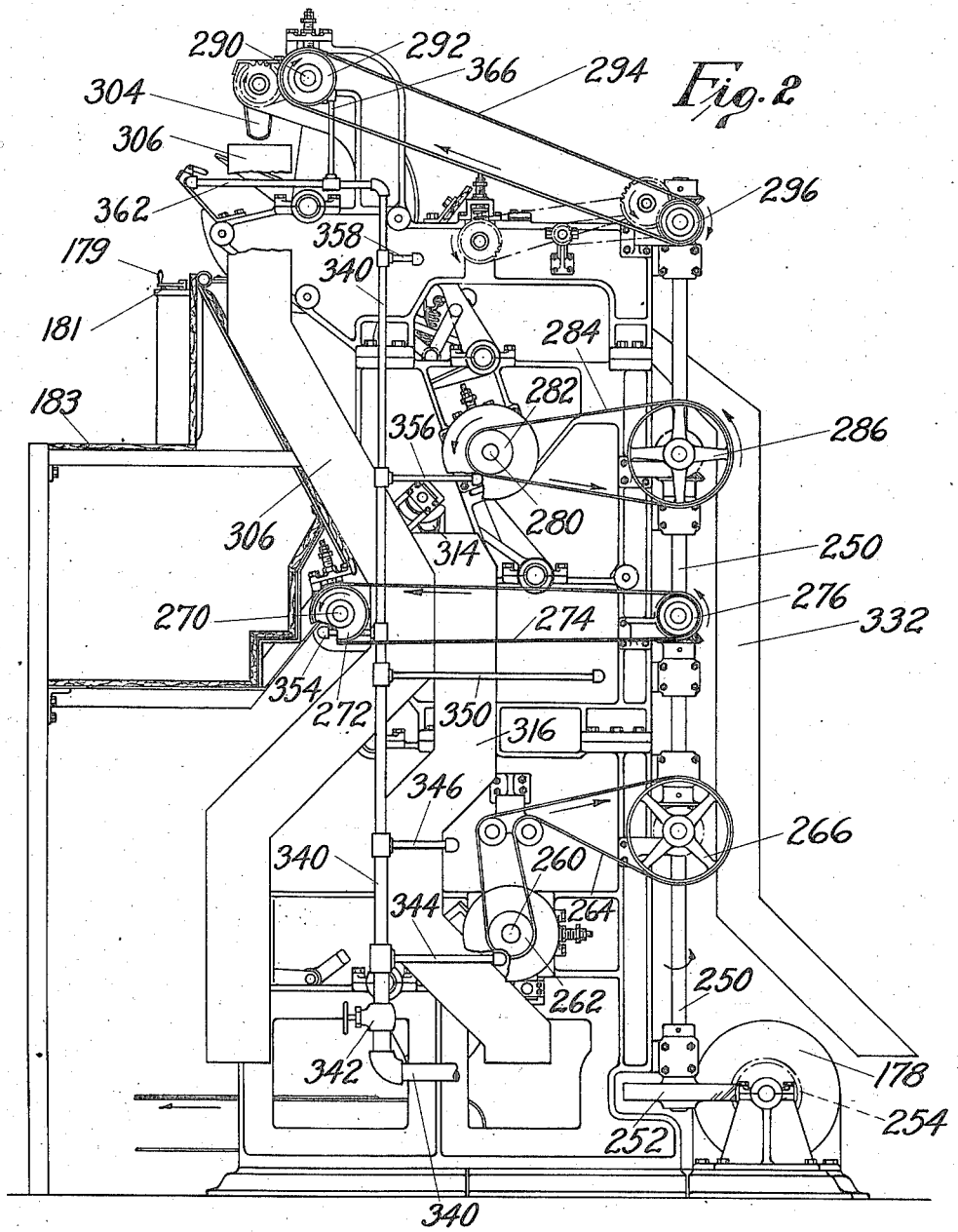

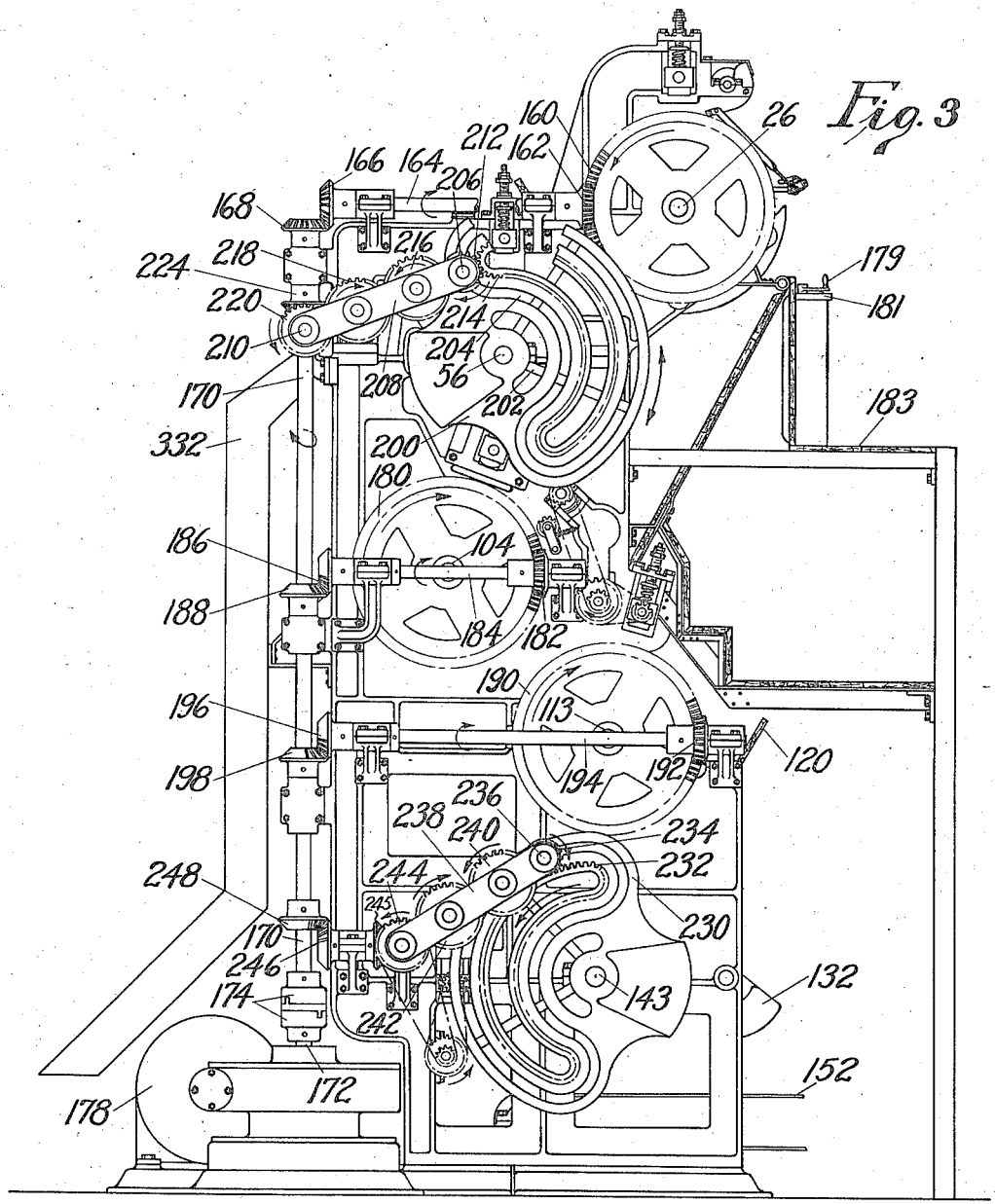

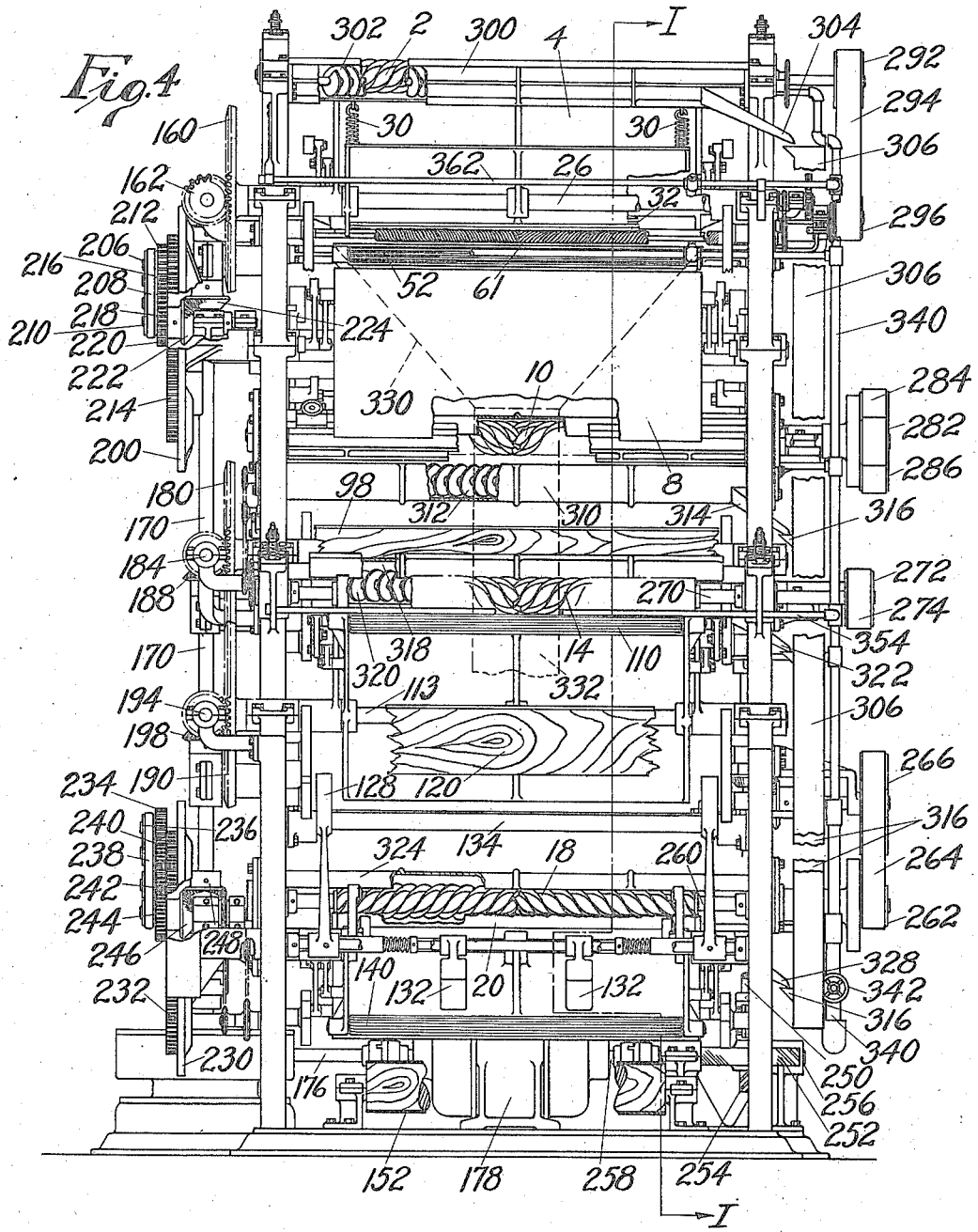

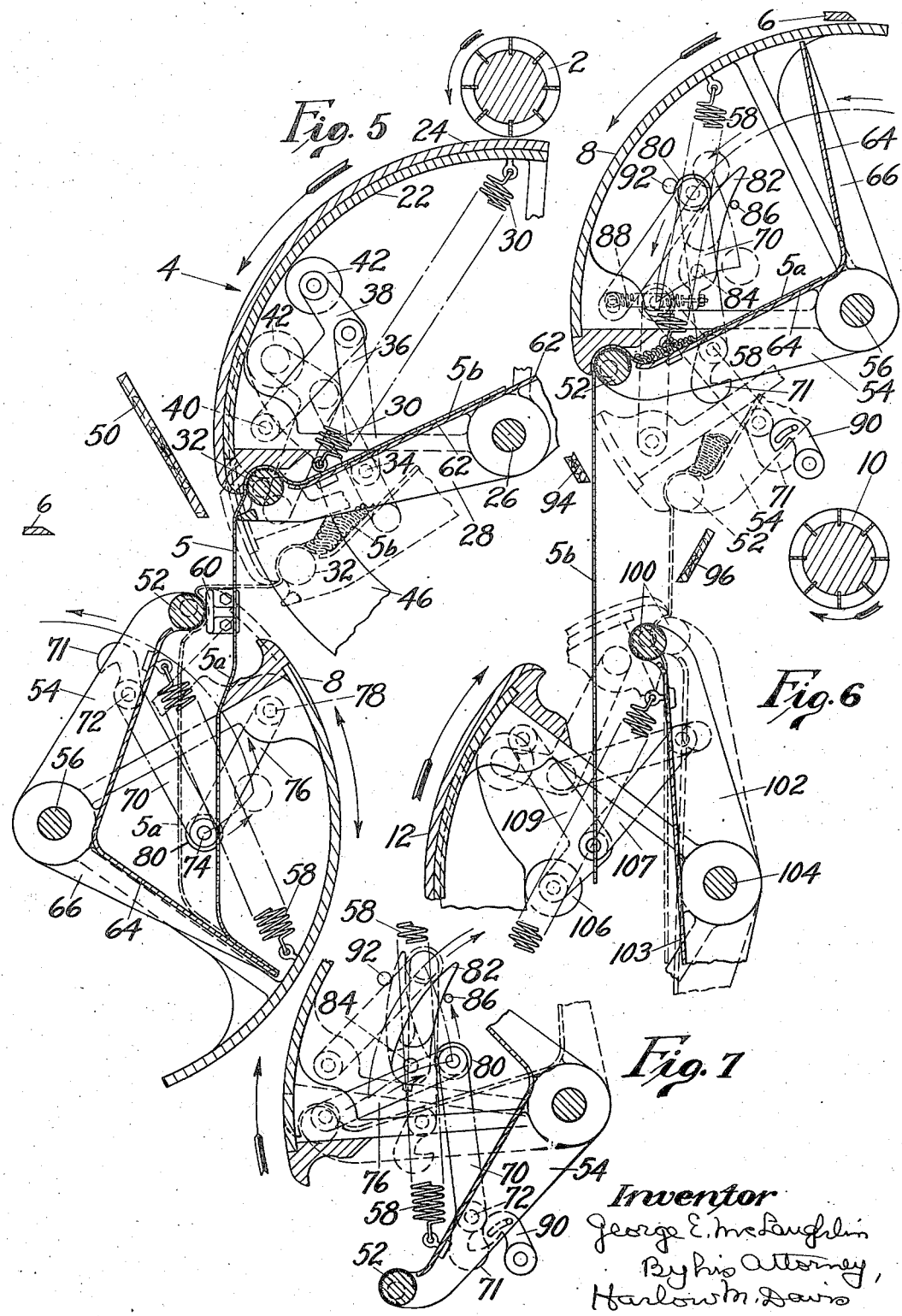

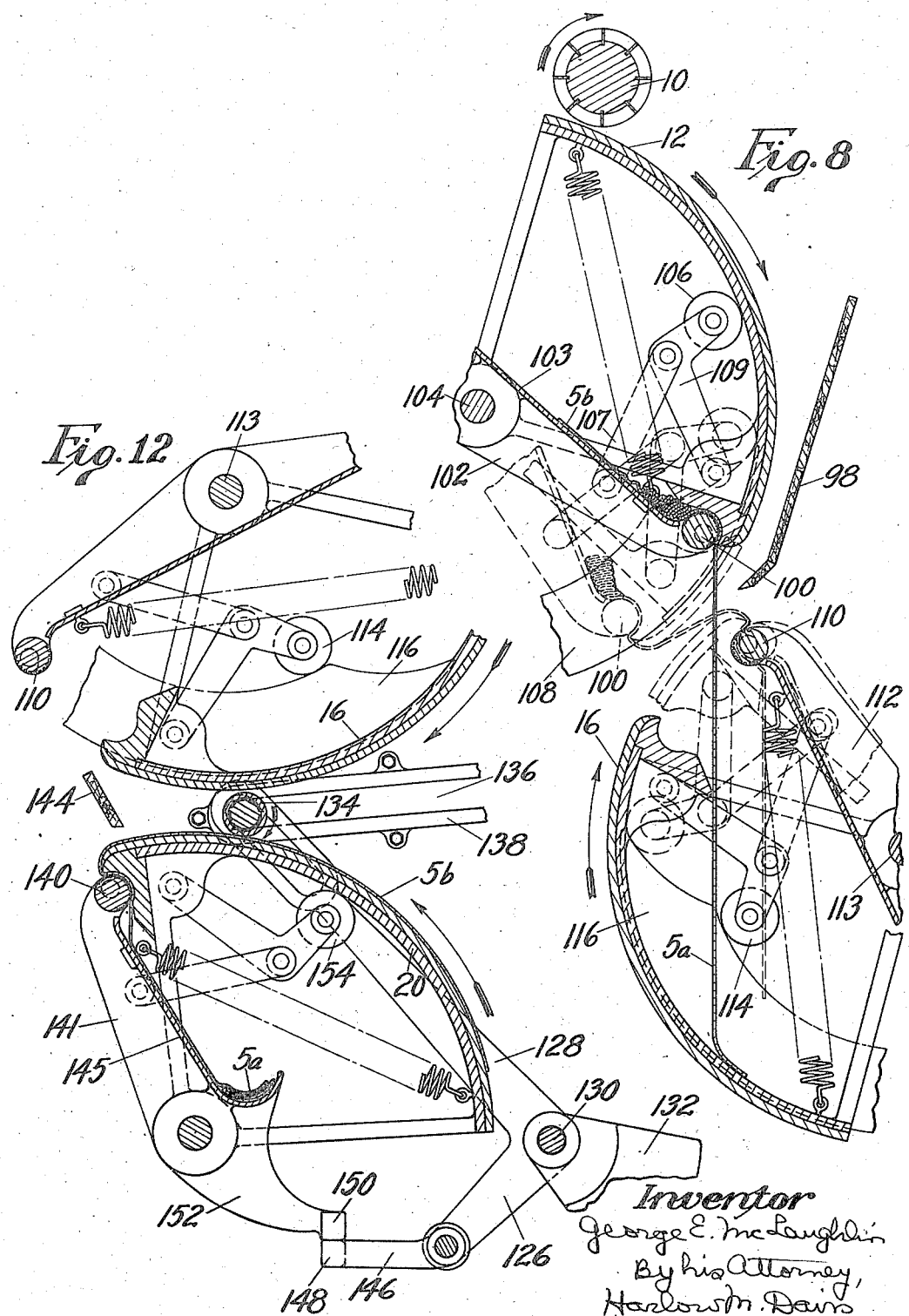

May 19, 1936. G. E. McLAUGHLIN 2,041,080
MACHINE FOR OPERATING UPON SHEET MATERIAL
Filed Dec. 11, 1933 12 Sheets-Sheet 7

Inventor
George E. McLaughlin
By his Attorney,
Harlow M. Davis

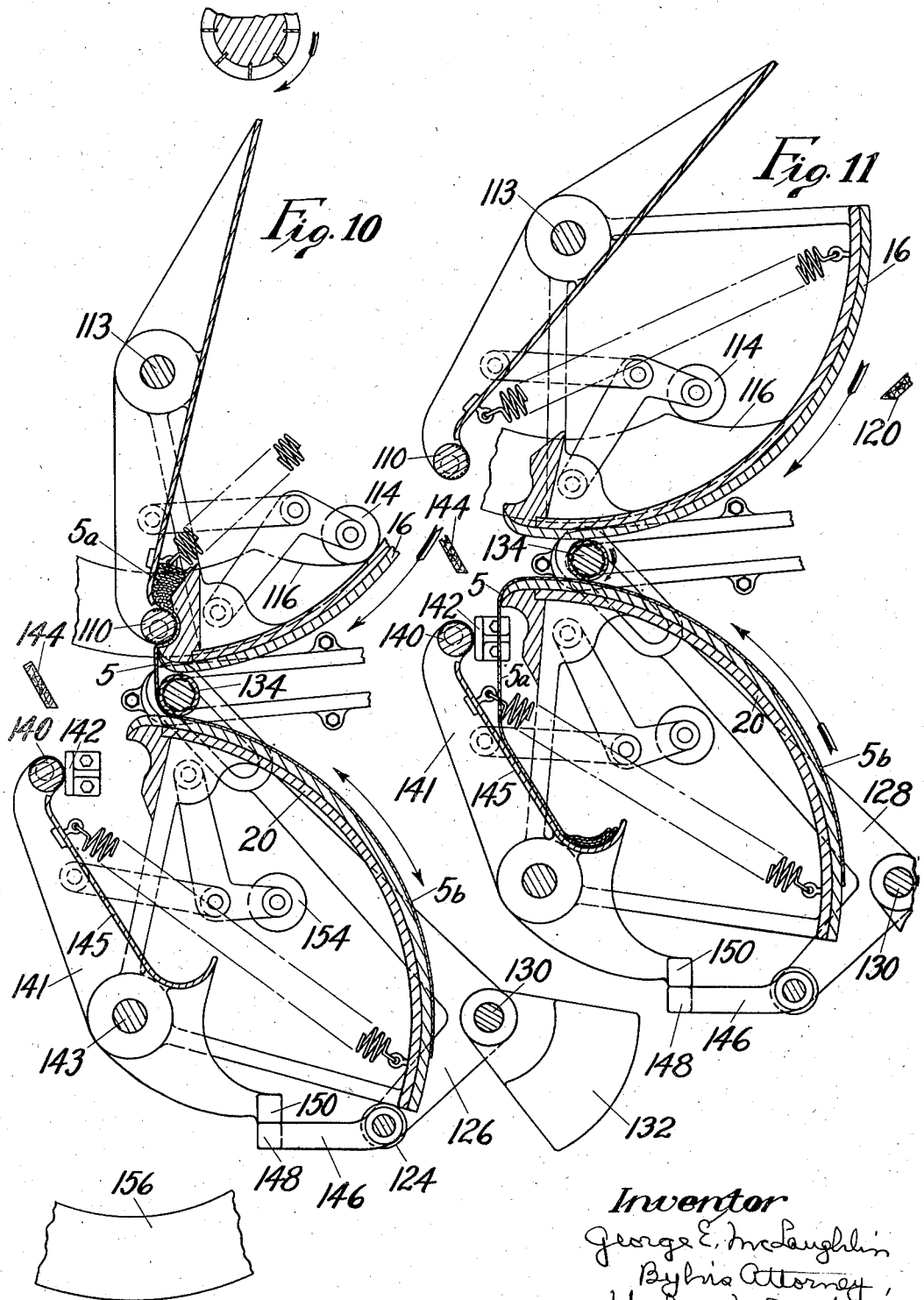

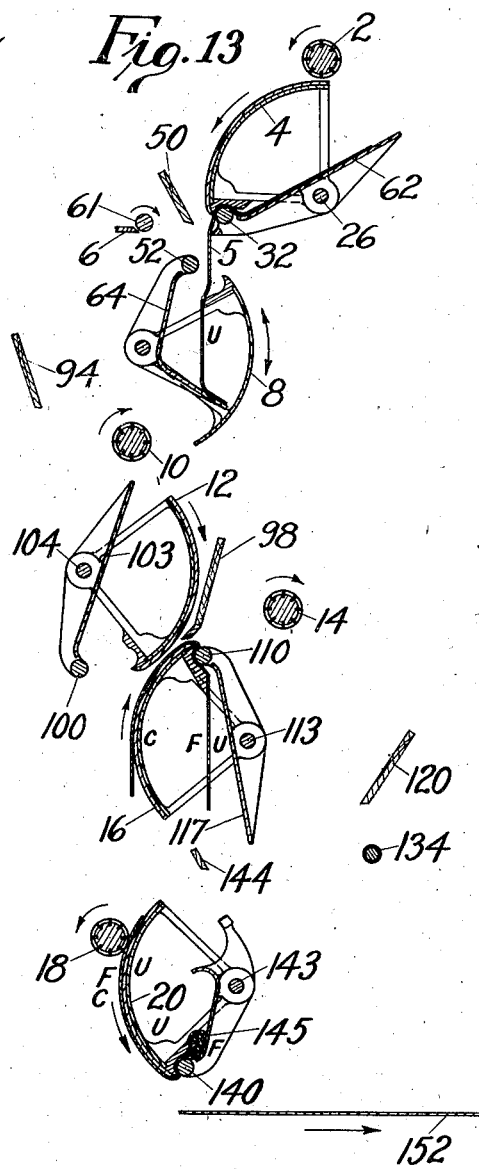
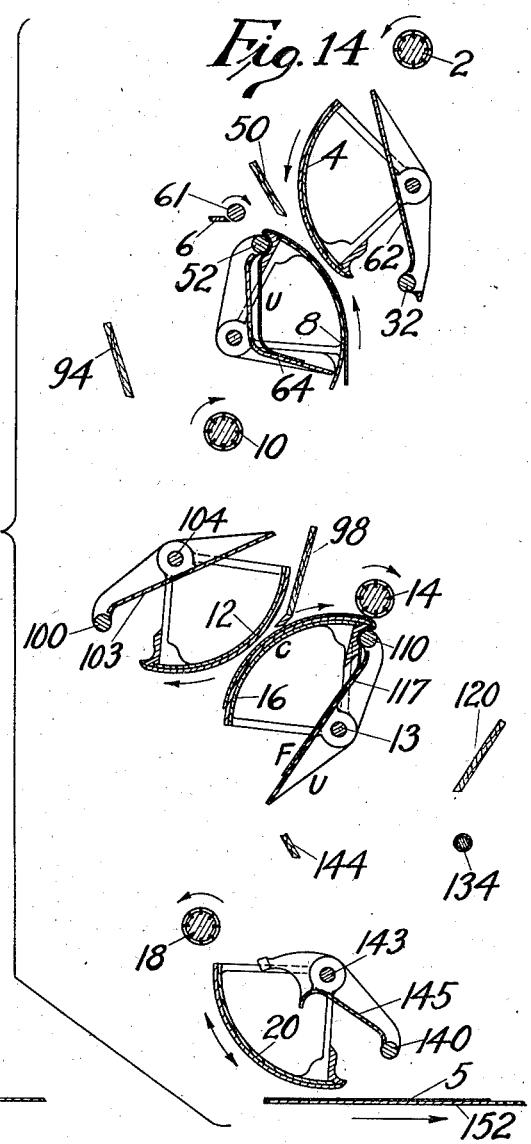
Fig. 13
Fig. 14

May 19, 1936.  G. E. McLAUGHLIN  2,041,080
MACHINE FOR OPERATING UPON SHEET MATERIAL
Filed Dec. 11, 1933  12 Sheets-Sheet 10
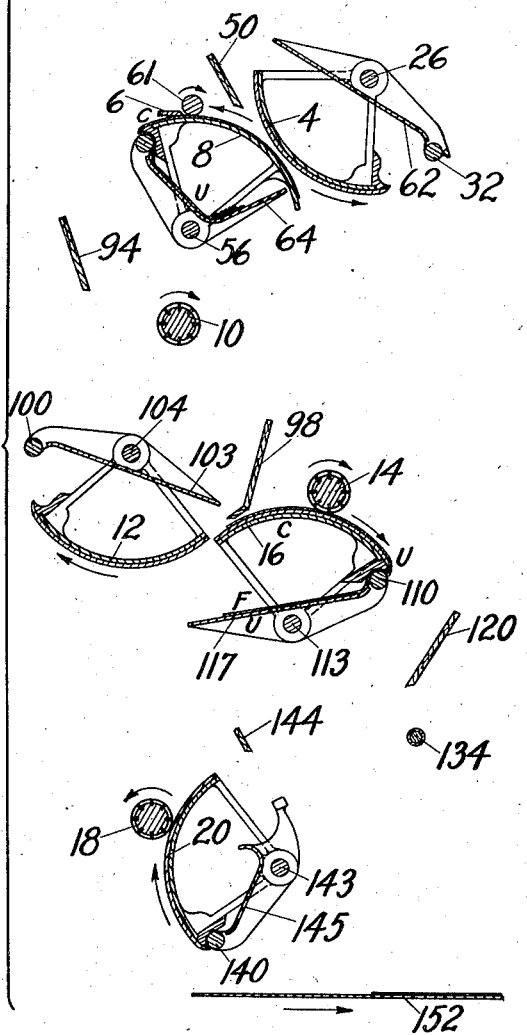
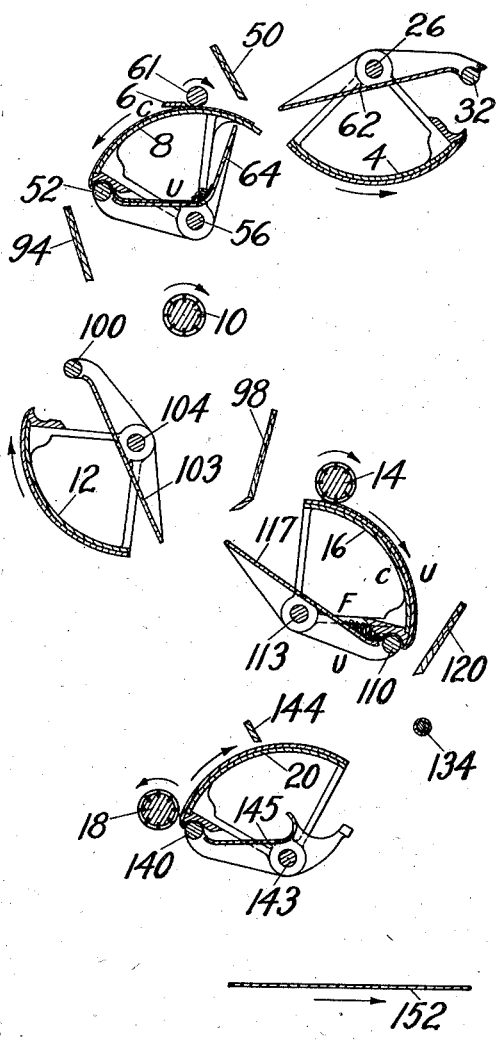
Inventor
George E. McLaughlin
By his Attorney
Harlow M. Davis May 19, 1936. G. E. McLAUGHLIN 2,041,080
MACHINE FOR OPERATING UPON SHEET MATERIAL
Filed Dec. 11, 1933 12 Sheets—Sheet 11
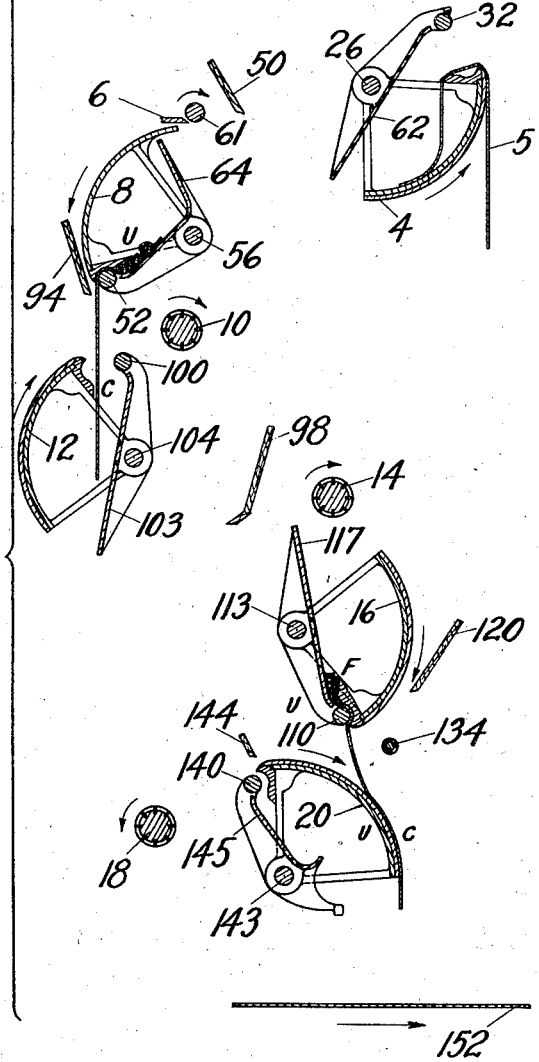
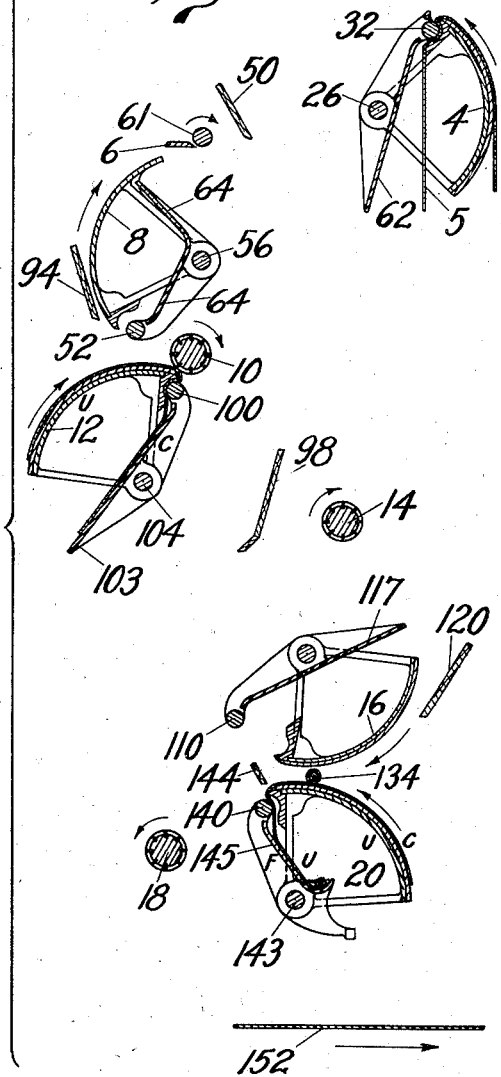
Inventor
George E. McLaughlin
By his Attorney
Harlow M. Davis May 19, 1936.  G. E. McLAUGHLIN  2,041,080
MACHINE FOR OPERATING UPON SHEET MATERIAL
Filed Dec. 11, 1933  12 Sheets-Sheet 12
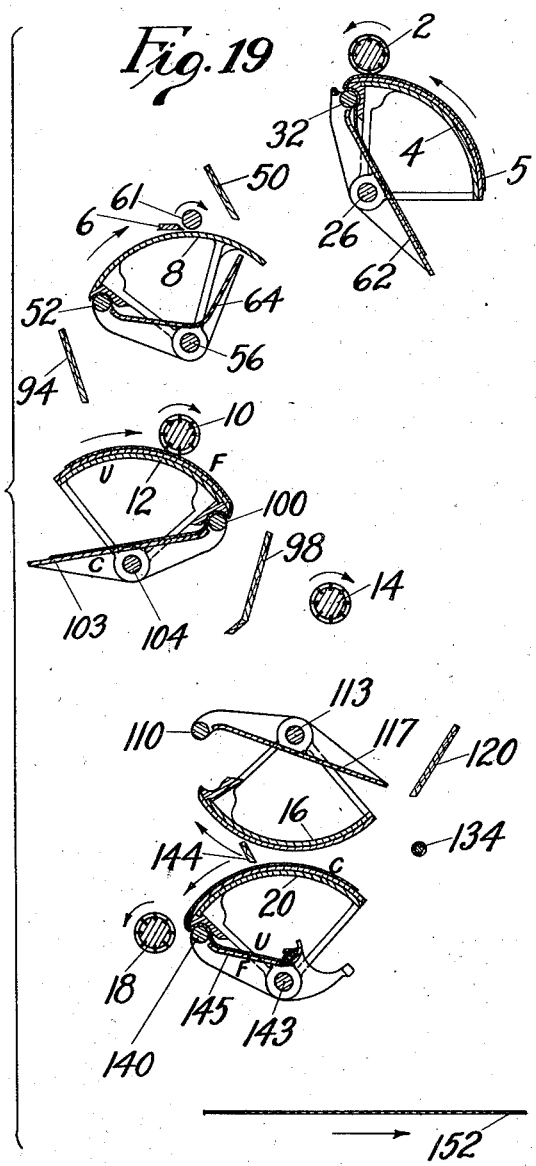
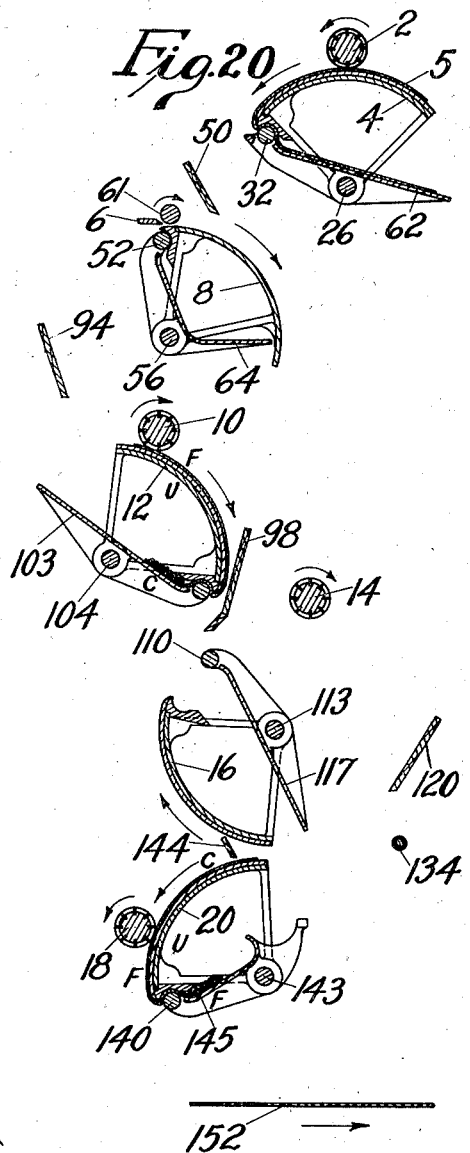
Inventor
George E. McLaughlin
By his Attorney
Harlow M. Davis Patented May 19, 1936

2,041,080

UNITED STATES PATENT OFFICE 2,041,080

MACHINE FOR OPERATING UPON SHEET MATERIAL

George E. McLaughlin, Salem, Mass., assignor to The Turner Tanning Machinery Company, Portland, Maine, a corporation of Maine Application December 11, 1933, Serial No. 701,786

35 Claims. (Cl. 149—16)

This invention relates to machines for operating upon sheet material and as herein illustrated is embodied in a beamhouse machine for use in the treatment of hides and skins preliminarily to tanning operations. While the invention is illustrated as embodied in a special machine for performing unhairing, cheeking, and fleshing operations, it is to be understood that the invention and various important features thereof may have other applications and uses.

It has heretofore been the practice to construct beamhouse machines such as the fleshing, cheeking, and unhairing machines as separate units, each requiring the services of one or two men, depending on the size of the work piece. An operator of a commercial type of unhairing or fleshing machine must present the piece of work to the machine with about one-half of the piece of work in position to be operated upon. He must then treadle the machine to start its operation, wait for the machine to treat that portion of the work, again treadle the machine so that the work support may move to work receiving position, then reverse the work and enter the untreated portion, again treadle the machine to cause operation on the untreated portion of the work, wait while the work is being treated, and finally treadle the machine to cause movement of the work support to work receiving position. It will be readily understood that these operations consume very considerable time and involve a substantial amount of manual labor both in handling the skin and in treadling the machine. Since cheeking operations are performed only upon the head and neck end of a hide or skin, the latter is presented but once to the machine but the operator must treadle the machine twice, once to initiate its operation and a second time to cause movement of the work support to work receiving position.

It is an object of this invention to provide a single machine which will perform two or more beamhouse operations upon each hide or skin upon once introducing the hide or skin into the machine. Further objects of the invention are to increase production and lower costs by reducing the number of workers required for a given output, while at the same time maintaining a high standard of quality in the work produced.

To these ends and in accordance with an important feature of the invention a series of tools for performing different operations upon hides or skins are provided with work supports for receiving and for presenting the work to the tools, the work supports and tools being so constructed and so arranged in alternation to each other that the work support associated with one tool delivers the work after treatment by its associated tool directly to the work support associated with another tool, the work being treated successively in various portions thereof until it is completed and ejected at the delivery end of the machine. Preferably and as shown, the tools will operate at substantially higher speeds than that of the work supports. When this machine is set in operation the operator is required simply to enter the work into the machine which then automatically treats all the various portions of the work and delivers it completely treated. It is clear that the operator is relieved of most of the labor heretofore necessary in handling the work and in treadling the machine and that his output is very substantially increased. Furthermore, one operator is sufficient for this machine, which performs two or more work treating operations, whereas heretofore one and sometimes two workers had to be employed for each operation.

In a preferred form of the invention the work supports associated with the tools are provided with work clamping means so arranged that the work is clamped by a succeeding work clamping device before it is released by the preceding work clamping device whereby the work is held against displacement during treatment on different portions thereof and is maintained under absolute control at all times and in such manner as to insure proper delivery of the work from one work support to another in the chain of work treating means, the work supports and the clamping means being so operatively tied together that the various treatments of the skin follow each other in such an orderly and precise manner as to insure perfect treatment of all portions of the work.

As illustrated, hollow drums with work clamping members located inside thereof are employed as work supports for presenting portions of hides, skins, and leather to suitable tools while such portions are resting in extended condition upon the external cylindrical surfaces of the drums, the drums being so timed with respect to their tools and with respect to each other that, following treatment by a given tool, the drum associated with that tool delivers the work directly to the next succeeding drum while the latter is in properly timed work receiving position. To insure this proper timing of the drums they are all driven through gear mechanism connected to a single shaft as the source of power.

These and other important features of the invention and novel combinations of parts will now be described in detail in the specification and then pointed out more particularly in the appended claims.

In the drawings,

Fig. 2 is a side elevation looking from the right in Fig. 4;

Fig. 3 is a side elevation looking from the left in Fig. 4;

Fig. 4 is a view in front elevation of the machine shown in Figs. 1, 2, and 3;

Fig. 5 is a detail illustrating the delivery of a piece of work from the first to the second drum, taken in order from the top of the machine;

Fig. 6 is a detail view showing the delivery of a hide or skin from the second to the third drum;

Fig. 7 is a detail of the second or cheeking drum;

Fig. 8 is a detail view showing the delivery of a piece of work from the third to the fourth drum;

Figs. 9, 10, 11, and 12 are four similar views showing the delivery of a piece of work from the fourth to the fifth drum; and Figs. 13 to 20, inclusive, are more or less diagrammatic views of all five drums showing the automatic delivery of pieces of work past the work treating tools and from drum to drum through the machine to the delivery conveyor. Each view shows the five drums, work clamping means, work treating tools, and pieces of work in their correct relative positions.

Fig. 13 is in the same stage of the work cycle as Fig. 1, Figs. 13 to 20, inclusive, progressively following the work cycle, there being in each case a 45° angular advance of drum No. 1, so that in the eight views drum No. 1 has made a complete revolution.

Figure 1:
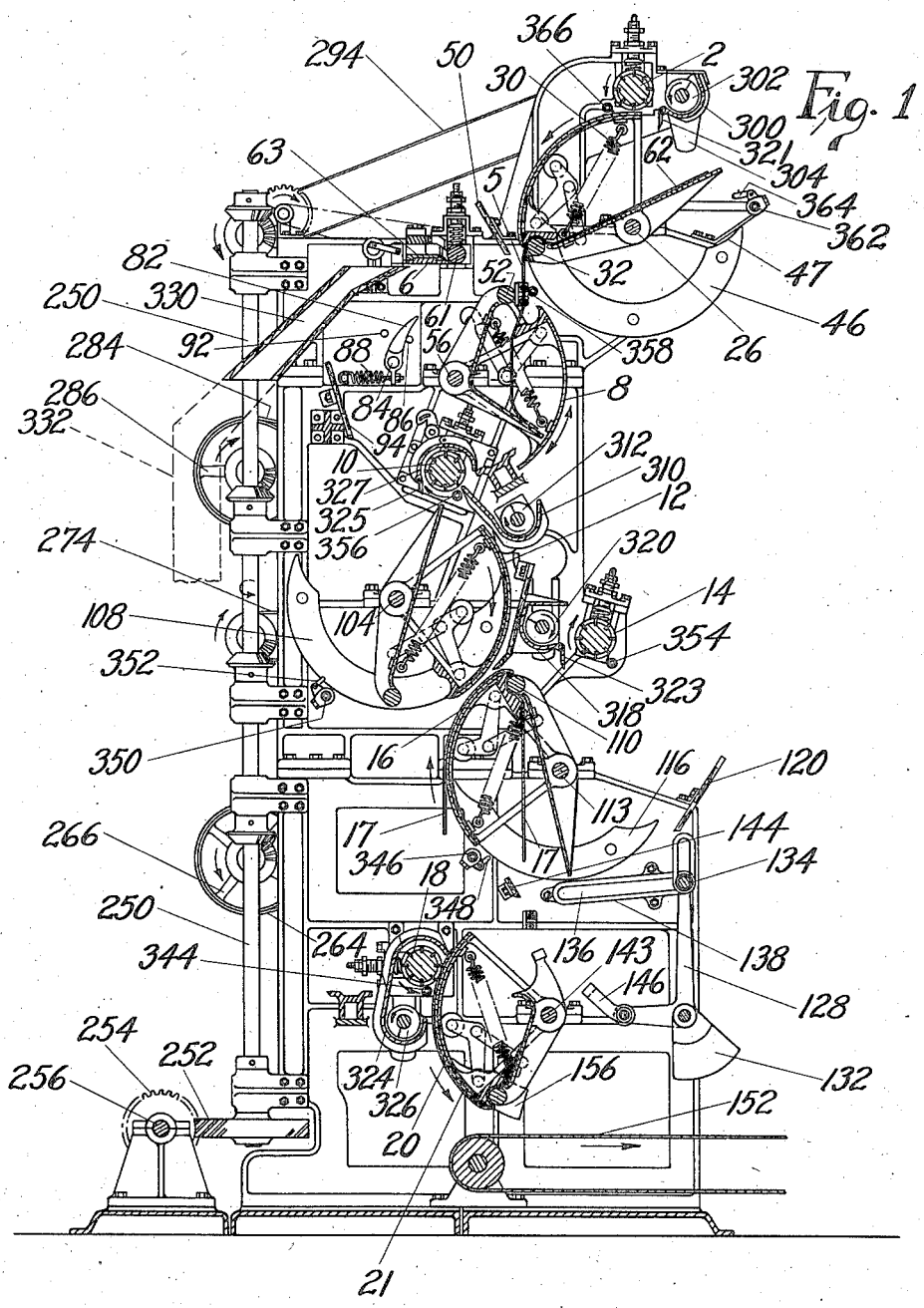
Fig. 1 is a sectional view, taken along the line of I—I of Fig. 4, of a beamhouse machine illustrating one embodiment of the invention.
Figure 9:
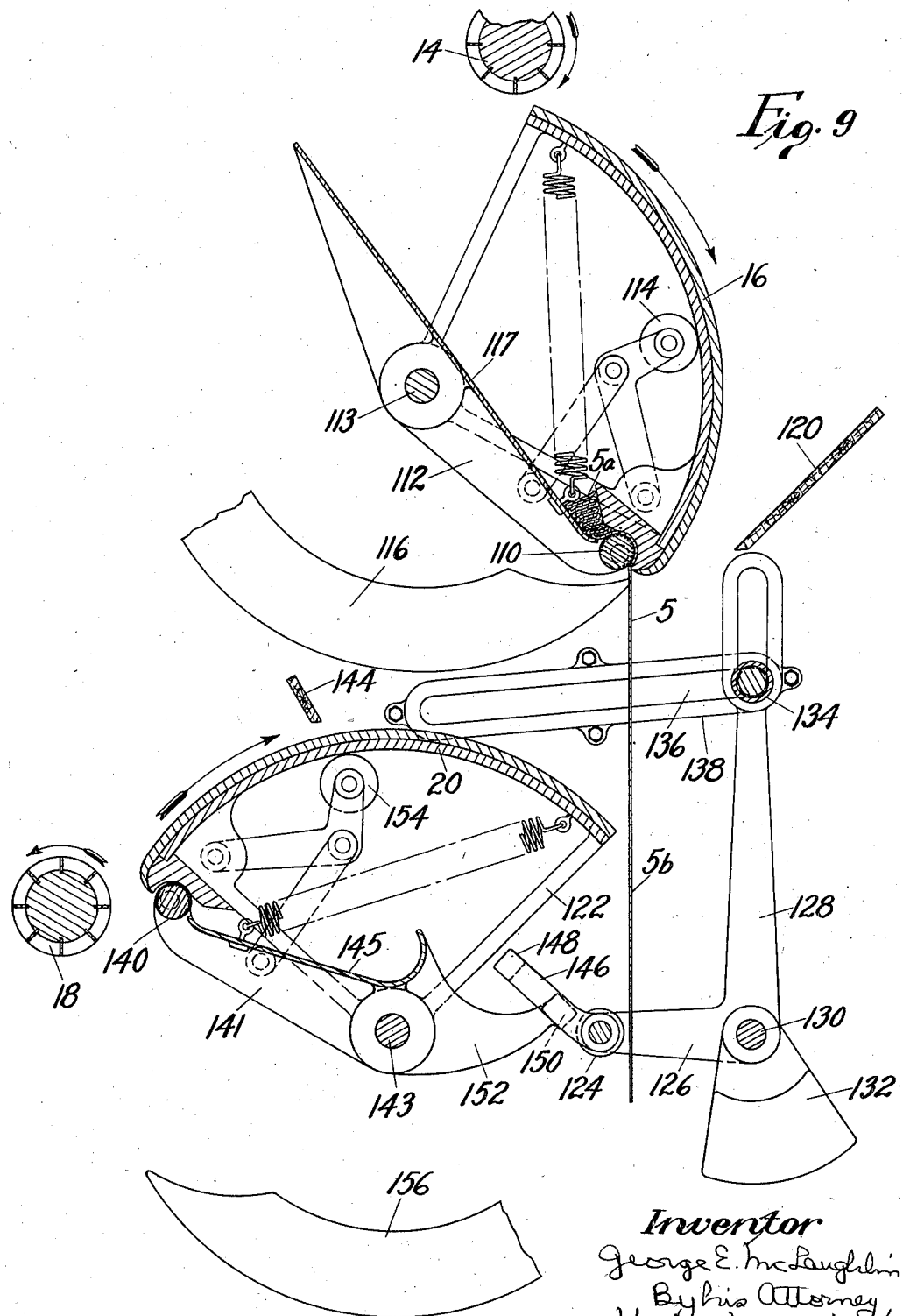

In the illustrated machine, which is designed particularly for unhairing, cheeking, and fleshing operations upon hides or skins, there is provided a bladed cylinder 2 (Fig. 1) for co-operation with a rotary, cylindrical, work-supporting member 4 in performing unhairing operations upon a piece of work, such as a calf skin 5. While the member 4 is not a complete cylinder or drum, it and other similar work supports of the illustrated machine will, for the sake of convenience be referred to as drums. Below the cylinder 2 and drum 4 is a reciprocable cheeking knife 6 with its co-operating drum 8, the drum 8 being shown in reversing position, as indicated by the double headed arrow, and as just ready to engage the skin 5 to present it to the cheeking knife 6. Below the drum 8 is a bladed cylinder 10 arranged for co-operation with a drum 12 in fleshing a part of a skin to be delivered by drum 8 to drum 12. Below and to the right of drum 12 in Fig. 1 is a cylinder 14 for co-operation with a drum 16 for completing the unhairing operation upon a skin 17 which preceded skin 5 into the machine. Below the drum 16 is a bladed cylinder 18 arranged for co-operation with a drum 20 in completing the fleshing operation upon a skin 21 which preceded skin 17 into the machine. It is to be understood that the cheeking knife 6, may be adjusted to inoperative position so that only fleshing and unhairing operations will be performed upon certain skins, as for instance, kid and sheepskins.

Referring now particularly to Figs. 1 and 5, it will be observed that the drum 4 comprises an arcuate metal member 22 covered by a rubber sheet 24 suitably secured thereto. Pivoted upon a shaft 26 which supports the drum 4 is a pair of arms, one of which is shown at 28, which are constantly urged toward clamping position by a spring 30 secured to the arm and to a suitable projection on the inside of the drum 4. At their free ends the arms 28 carry a clamping roll 32 which is eccentrically mounted in the ends of the arms 28 and has a knurled or corrugated surface to engage the work and hold it against displacement. Pivoted to each arm 28 at 34 is a link 36 also pivoted to a link 38, one end of which is pivoted at 40 to a bracket extending from the inner surface of the drum 4. Carried by the free end of the link 38 is a roll 42 arranged to ride upon a cam end 44 of a stationary cam member 46, the arrangement being such that as the roll 42 rides up on the cam member 46 the toggle formed by the links 36 and 38 is extended to move the corresponding arm 28 in such manner as to open the work clamping means comprising the clamping roll 32. Upon inspection of Fig. 5 it will be observed that the clamping roll 32 and associated parts are shown in full lines in work clamping position and in dotted lines still in work clamping relation an instant before relative movement of the parts takes place to release the work piece. The clamping roll 32 remains open while roll 42 rides on the relatively extensive cam member 46, the clamping roll 32 closing again as the roll 42 runs off the cam end 47 (Fig. 1) of the member 46. While the clamping roll was open a piece of work was introduced into the drum 4 by the operator as indicated in Fig. 17.

In Fig. 5 the lower part 5a of the skin 5 has dropped from the outer surface of the drum 4 into the suspended position shown and has been projected into drum 8, a baffle plate or guide member 50 being so positioned as to assist in directing or guiding the portion 5a of the skin 5 to the opening in the drum 8. It will be understood that the part 5a of the skin 5 was unhaired through co-operation of the bladed cylinder 2 and the drum 4, this operation being shown as taking place in Figs. 19 and 20.

The cheeking drum 8 in Figs. 1 and 5 is illustrated as having reached the end of its rotation in a clockwise direction, at which time the drum has moved away from a work clamping roll 52 similar in all respects to the work clamping roll 32 of drum 4 and similarly mounted upon arms, one of which is shown at 54 rotatably carried by a shaft 56, upon which the drum 8 is mounted for oscillatory movements, as will be hereinafter described. The arms 54 of the clamping roll 52 are each constantly urged in one direction by a spring 58, the clamping roll in Fig. 5 having engaged at each of its ends a stop member 60 secured to the frame of the machine, the stops 60 being so positioned that the drum 8, in continuing its rotation in a clockwise direction after clamping member 52 engages stops 60, opens up a space, as clearly shown in Fig. 5, into which the part 5a of the skin 5 is projected under the force of gravity. An instant later the drum 8 moves in a counterclockwise direction to close the space and to engage the work and press it against the clamping roll 52. As the drum 8 continues in its counterclockwise rotation, the other part 5b of the skin 5 is released by the clamp 32 of the drum 4 and is received upon the external cylindrical surface of the drum 8 and is carried by the drum into work presenting position with respect to the cheeking blade 6, as indicated in Figs. 15 and 16. Upon reference to Fig. 1, it will be observed that a feed roll 61 is provided to assist in feeding the skin to the knife and to feed the skived or cheeked portion of the skin, cut off by knife 6, over a guide plate 63 above the knife 6. For a more detailed description of the cheeking mechanism, reference may be had to United States Letters Patent No. 1,624,921 granted April 19, 1927, upon application of W. E. Broughton.

It may be noted at this point that the clamping arms 28 of the drum 4 carry a sheet metal member 62 which serves as a suitable work holder or support for the portion 5b of the skin 5 and also as a guiding surface down which this part of the skin slides as it is being transferred to the external cylindrical surface of the drum 8. Furthermore, the clamping arms 54 supporting the clamping roll 52 of the drum 8 are also provided with a sheet metal member 64 extending the full length of the drum 8 and serving as a work holder or support, the sheet 64 being also supported by angular extensions 66 of the arms 54. The work holders 62 and 64 together with their associated clamping rolls 32 and 52 constitute devices for transferring the work piece from drum 4 to drum 8, as will be clear from the following description.

For operating the clamping roll 52 (of the drum 8) and its supporting arms 54 there is provided, in connection with each arm 54, a link 70 (Figs. 5, 6, and 7) having an integral hook 71 and pivoted at 72 to the arm 54 and by a pivot 74 to a link 76 having its other end pivoted at 78 to a bracket extending inwardly from the inner surface of the drum 8. Mounted rotatably upon the pivot 74 is a roll 80 for cooperation with a movable buffer member 82, as will hereinafter be described. Referring now to Figs. 1, 6, and 7, it will be observed that the buffer member 82 is pivoted at 84 upon a stationary part of the machine frame and is held yieldingly pressed against a pin 86 by a spring member 88. During rotation of the drum 8 in a counterclockwise direction the roll 80 on the link members 70 and 76 passes down the left-hand surface of the buffer member 82 as indicated in Figs. 6 and 7 during which time the clamping roll 52 is held in clamping position with respect to the drum 8 by the springs 58. Practically at the end of the rotation of the drum 8 in a counterclockwise direction in Fig. 6, the hook 71 on the link 70 cams a locking pawl 90 to the right and engages with it so that, upon reversing movement of the drum 8, the clamping arms 54 are held against movement whereby the drum 8 (now moving in a clockwise direction) leaves the clamping roll 52 behind, as indicated in dotted lines in Fig. 6 and in full lines in Fig. 7, thereby releasing the upper part 5a of the skin so that it may drop upon the exterior cylindrical surface of the drum 12. As the drum 8 continues its rotation in a clockwise direction, as indicated in Fig. 7, the link 70 is rocked about its pivot 72 in such manner as to move the hook 71 out of engagement with the locking pawl 90, whereupon the springs 58 instantly pull the clamp carrying arms 54 to clamping position although no work is engaged thereby, the clamping arms and clamp remaining in clamping position until they engage the stops 60, as heretofore described in connection with the showing of Fig. 5. In order that the movement of the clamping roll 52 to clamping position may be cushioned, the rolls 80, during the described movement, engage the buffer members 82 which yield against the tension of springs 88 while being forced over into engagement with stationary pins 92, as indicated in Fig. 7.

As stated in connection with the description of Fig. 5 the part 5b of the skin 5 is delivered upon the external cylindrical surface of the drum 8 so that it may be operated upon by the cheeking knife 6 during rotation of the drum 8 in a counterclockwise direction. Completion of this movement of the drum 8 is indicated in Fig. 6 which shows the part 5b of the skin 5 as having dropped by gravity from the drum 8 into the open part of the drum 12 where it hangs suspended, the part 5b of the skin 5 having been guided during its descent by a baffle plate or guide member 94. A moment later the drum 8 has reached its dotted line position, as shown in said Fig. 6, and is then moved in the reverse direction, leaving the clamping roll 52 and the clamp holding arms 54 said dotted line position. Meanwhile the drum 12, moving in the direction of the arrow in Fig. 6, has closed upon the part 5b of the skin 5 and, continuing in the same direction, takes up the remainder 5a of the skin 5 upon its external cylindrical surface, the skin being guided by a baffle plate or guide member 96 as it drops from the holder 64 in drum 8, as shown in Fig. 6, and as indicated in Figs. 17, 18, 19, and 20.

Referring now to Fig. 8, it will be seen that the drum 12 toward the end of its rotation in a clockwise direction (Figs. 6 and 8) discharges the portion 5a of the skin (after it has been fleshed by cylinder 10) into an opening prepared for it in the drum 16, a baffle plate or guide member 98 carried by the machine frame being operative to assist in proper delivery of the skin to drum 16. In the drum 12 there is provided a clamp member 100 carried by arms one of which is shown at 102 pivoted upon a shaft 104 of the drum 12. Arms 102 carry a sheet metal work holder 103 similar to work holder 62 of drum 4. This clamping roll 100 is operated through a spring and link toggle mechanism very similar to that described in connection with drum 4, it being pointed out that a roll 106, carried by toggle links 107, 109, is lifted at the proper time by a stationary cam member 108 (Figs. 1 and 8) to open the clamping roll 100 to discharge the part 5b of the skin, which is then picked up by the drum 16 as the latter turns in clockwise direction in Fig. 8 whereby the part 5b of the skin is spread out on the external cylindrical surface of the drum 16. The cam member 108 also controls the closing of the clamping roll 100 as described in connection with the clamping roll 32 of drum 4.

As shown, the drum 16 is provided with a clamp roll 110 carried by arms one of which is shown at 112, rotatable on shaft 113 of the drum, and each of which is operated by a roll 114 arranged to ride up on a stationary cam 116 which is a double-ended cam similar to cam member 108 and is operated in the manner described with relation to similarly operated clamping members in drums 4 and 12. Mounted on arms 112 is a sheet metal work holder 117 similar to work holder 62 of drum 4, the work holder 117 and the clamping roll 110 serving as a work transferring device for drum 16.

From the drum 16 the skin, after being operated upon by bladed cylinder 14, is discharged into and upon the drum 20 (Fig. 1) for operation by the bladed cylinder 18. Referring to Figs. 9, 10, 11, and 12, it will be seen that as the drum 16 approaches the position shown in Fig. 9, the part 5b of the skin having been operated upon by bladed cylinder 14, slips from the external cylindrical surface of the drum 16 under the force of gravity and, through the aid of a baffle plate or guide member 120, is disposed in the suspended position shown in Fig. 9 at a time when the drum 20 is moving in a clockwise direction in returning for a fresh piece of work. Later, as the drum 20 continues to move in a clockwise direction, a part thereof, which is conveniently a spoke 122 of the drum, engages a roll 124 on an arm 126 of a bell crank lever 128 secured to a shaft 130 journaled in the frame of the machine, with the result that the bell crank 128 is swung in a counterclockwise direction in these views against the force of gravity operative in weights 132 secured to the supporting shaft 130 (Figs. 1, 4, 9 to 12, inclusive) the bell crank during its movement operating to slide a rubber covered roll 134 along slots 136 in guide members 138 carried by the machine frame. During its movement toward the left in Figs. 9 to 12, inclusive, the roll 134 engages and carries the part 5b of the skin 5 over the external cylindrical surface of the drum 20, the drum 20 reaching the extreme of its movement in a clockwise direction in the position shown in Fig. 10 of the drawings. In this position of the drum 20, it has moved away from its clamping roll 140 (carried by arms 141 rotatable on shaft 143 of the drum 20) which has been stopped by stop members 142 carried by the frame of the machine, the arrangement being similar to that already described in connection with drum 8 (Fig. 5). Hence, in this position of the drum 20 the latter is open for the reception of the part 5a of the skin which is discharged into the drum 20 as the roll 114 of the drum 16 moves up on the cam member 116, Fig. 10 showing the drum 16 just at the instant that the roll 114 starts rising on the cam 116, and Fig. 11 showing the clamping roll 110 in open position whereby the part 5a of the skin is released (Fig. 11) to drop into the drum 20 through the opening provided by the clamping roll 140 in its open position. Carried by the arms 141 is a sheet metal work holder 145 which together with the clamping roll 140 serves as a work transferring device (Figs. 13 and 14). In this discharge of the part 5a of the skin into the drum 20, a guide member or baffle plate 144 guides the skin during its descent under the force of gravity. Figs. 11 and 12 show the drum 20 moving in a counterclockwise direction, first to close the drum upon the clamping roll 140 and then to carry the skin into co-operative relation with respect to the bladed cylinder 18. As the drum 20 in its rotation in clockwise direction (Figs. 9 and 10) causes the spoke 122 thereof to engage the roll 124 of the bell crank lever 128, it also causes a stop arm 146 (with its stop 148), integral with the arm 126 of the bell crank lever 128, to pass by a stop 150 on an arm 152 integral with the corresponding clamp roll arm 141, the relationship of the stop members 148 and 150 being such that, as the drum 20 starts in the reverse direction, that is, in a counterclockwise direction (Fig. 10), and thus moves away from the roll 124 on the arm 126 of the bell crank 128, the latter (bell crank 128) is held through the co-operation of the stop members 148 and 150 in such position that the roll 134 is maintained in its operative work positioning relation to the drum 20. Later, the stop member 150 moves away from the stop member 148, thus releasing the bell crank lever 128 so that the bell crank levers 128 may return to initial position under the action of the weights 132, thus returning the roll 134 to its inoperative position of rest at the right end of the slots in the slot bars 138.

During further movement of the drum 20 in a counterclockwise direction the part 5b of the skin 5 is operated upon by the bladed cylinder 18, as indicated in Figs. 19, 20 and 13, respectively, Fig. 14 indicating complete discharge of the skin upon a traveling conveyor belt 152, opening of the clamping bar 140 of the drum 20 taking place through the operation of a roll 154 on a toggle link mechanism like that described in connection with drums 4, 12, and 16, the roll 154 of the drum 20 being operated by a stationary cam 156 carried by the machine frame.

It is pointed out that in connection with the description of Figs. 5 to 12, inclusive, a skin 5 has been carried through all the beamhouse operations, the part 5a of the skin 5 being unhaired while upon the drum 4, through operation of the bladed cylinder 2. Later the part 5b of the skin 5 is cheeked while resting upon the external cylindrical surface of the drum 8 and while the latter is co-operating with the reciprocatory cheeking blade 6. Upon completion of the cheeking operation upon the part 5b it is projected by gravity into the drum 12 while the part 5a of the skin is disposed upon the external cylindrical surface of the drum 12 to be fleshed by the bladed cylinder 10. Thereafter, the part 5b is disposed upon the external cylindrical surface of the drum 16 to be unhaired by the bladed cylinder 14, part 5b being subsequently discharged by the drum 16 into position to be carried into place upon the external cylindrical surface of the drum 20 by which it is presented to the bladed cylinder 18 for a fleshing operation. In this way the whole skin is unhaired, cheeked and fleshed before finally being discharged upon the traveling conveyor belt 152.

Upon reference particularly to Figs. 1 and 3 of the drawings it will be observed that the shaft 26 of the drum 4 has secured thereto a large gear wheel 160 arranged in mesh with a bevel gear 162 secured to the end of a shaft 164 mounted in bearings in the frame of the machine, said shaft 164 having fixedly secured at its outer end a bevel gear 166 in mesh with a bevel gear 168 secured to the upper end of a vertical shaft 170. As indicated in Fig. 3 the lower end of the shaft 170 is connected to the vertical shaft 172 in line with the shaft 170 by means of an Oldham coupling 174. The shaft 172 is driven by a worm and worm gear (not shown) at relatively low speed from a horizontal shaft 176 (Fig. 4) coupled to a rotor shaft extending from the left end of a motor 178 (Figs. 2 to 4, inclusive) which serves as a source of power for all of the moving parts of the machine. It will be clear, therefore, that so long as the motor 178 is running, the drum shaft 26 of the drum 4 is constantly rotated in one direction, namely, that indicated by the arrow in Figs. 1, 3, and 5. It will be understood that the motor 178 may be readily controlled by a manualy operable member 179 (Figs. 2 and 3) constituting part of a rheostat control 181 located on a platform 183 where the operator stands. Hence there is no tripping of treadles as in prior constructions. On the contrary the illustrated machine remains continuously in operation during working hours.

The shaft 104 of the drum 12 (Figs. 1 and 3) is driven constantly in the direction of the arrow by means of a large gear 180 secured to the shaft 104 and arranged in mesh with a bevel gear 182 secured to a shaft 184 having at its outer end a bevel gear 186 in mesh with a bevel gear 188 also secured to the vertical shaft 170. Similarly the drum 16, together with its shaft 113, is constantly driven in the direction of the arrow (Figs. 1 and 3) by means of a large gear 190 secured to the shaft 113 and arranged in mesh with a bevel gear 192 secured to a shaft 194 having at its other end a bevel gear 196 in mesh with a bevel gear 198 secured to the vertical shaft 170. It will be seen then, that drums 4, 12 and 16 together with their shafts 26, 104, 113, respectively, are driven continuously in a certain direction while the beamhouse machine is in operation.

On the other hand, the drums 8 and 20 (Fig. 1) while continuously under control by their respective driving means, reverse their direction of movement so as to oscillate back and forth in timed relation to the continuous movement of the other drums. To accomplish this result the shaft 56 (Figs. 1 and 3) of the drum 8 has secured thereto a combined cam and rack plate 200, of the type commonly known as a mangle wheel, carried by spokes 202 rigid with the shaft 56. As shown most clearly in Fig. 3, a cam slot 204 in the plate 200 serves to guide a roll (not shown) on a stub shaft 206 at the free end of a train arm 208 pivotally mounted upon a shaft 210 journaled in the machine frame. Also carried by the stub shaft 206 is a pinion 212 arranged to be held constantly in mesh with an endless curved rack bar 214 by means of the roll on the shaft 206. Meshing with the pinion 212 is a gear 216 rotatably mounted on the train arm 208 and in mesh with another gear 218 also rotatably mounted on the arm 208, the gear 218 being in turn in mesh with a pinion 220 secured to the shaft 210. Also secured to the shaft 210 is a bevel gear 222 (Fig. 4) arranged in mesh with a bevel gear 224 rigidly secured to the vertical shaft 170. It will be clear upon tracing through the train of driving connections just described that the mangle wheel or plate 200, rigidly secured to the drum shaft 56, is continuously under control of the gear train driven from the vertical shaft 170 and thus there is no chance for any slippage between the driving shaft 170 and the drum shaft 56, the connections in this respect being similar to the connections between the drum shaft 26 of the drum 4 and the said vertical shaft 170. Hence, the timing of the drum 4 on the shaft 26 with respect to the drum 8 on the shaft 56 is fixed through the described driving connections to the vertical shaft 170. This fact explains the continuously effective working of the drums with respect to each other, it being obvious that they can not possibly get out of step with each other.

Upon inspection of the driving connections for the shaft 143 (Fig. 3) of the drum 20, it will be observed that it is driven by an arrangement practically identical with that described in connection with the shaft 56 of drum 8. In other words, the shaft 143 has rigidly secured thereto a combined cam and rack plate or mangle wheel 230 in which a rack bar 232 meshes with a pinion 234 carried by a stub shaft 236 on a pivoted train arm 238, the pinion 234 being driven by gears 240, 242 and 244 and by bevel gears 245 and 246, the latter being in mesh with a bevel gear 248 rigidly secured to the vertical shaft 170. Where the pinion 212 is turning around the curved end of the rack bar 214, as shown in Fig. 3, there is a slowing up in the movement of the shaft 56 as the reversing point is approached in the rotation of said shaft 56. Moreover, the shaft 56 and the drum 8 come to a stop at the reversing point. This position of the shaft 56 in Fig. 3 corresponds to the position of the drum 8 and shaft 56 in Fig. 5, the drum 8 in Fig. 5 being at the reversing point, as indicated by the double headed arrow. The advantage of the drive between the pinion 212 and the curved end of the rack 214 resides in the fact that at the reversing point the work is introduced into the drum or released therefrom, Fig. 5 showing the part 5a of the skin 5 as having just dropped into the drum 8 while in Fig. 6 the part 5b of the skin 5 is being transferred into an opening in the drum 12 and shortly thereafter the part 5a of the skin is released by the clamp member 52 of the drum 8 so as to fall upon the external cylindrical surface of the drum 12. Since the receiving of a piece of work from one drum and the delivering of the same piece of work to another drum takes time to insure perfect reception and delivery, it is distinctly advantageous to have certain of the drums at least slacken in their movements and come to rest as is the case with drum 8 on the shaft 56 and the drum 20 on the shaft 143. It is another advantage of the mangle wheel drive that the idle or reversing movement of the drum is quickly accomplished, the speed of rotation of the drums 8 and 20 during their return for a fresh piece of work being considerably greater than the speed at which the drum turns to carry the work past the tool.

As stated, the vertical shaft 170 is a relatively slow speed shaft for driving the drums. For driving other movable parts of the machine a relatively high speed shaft is provided, the same being a vertical shaft 250 (Figs. 1, 2, and 4) arranged to be driven by means of a helically bladed gear 252 secured to said shaft 250 and arranged in mesh with a helically bladed gear 254 on a shaft 256 coupled to an armature shaft 258 of the motor 178. Upon reference to Figs. 1, 2, and 4 of the drawings, it will be observed that the bladed cylinder 18, which co-operates with the drum 20 in operating on the work, has a shaft 260 (Figs. 2 and 4) which carries at its outer end a pulley 262 about which passes a belt 264 from another pulley 266, the latter being driven through gear connections with the vertical shaft 250. For driving the bladed cylinder 14 the latter is provided with a shaft 270 (Figs. 2 and 4) having at its outer end a pulley 272 about which passes a belt 274 also passing about a pulley 276 arranged to be driven through the usual bevel gear connections with the vertical shaft 250. Similarly the bladed cylinder 10 is driven through its shaft 280 by pulley 282 about which passes a belt 284 also engaging a pulley 286 arranged to be driven by bevel gear connections with the vertical shaft 250. At the top of the machine the bladed cylinder 2 is driven through its shaft 290 by means of a pulley 292 about which passes a belt 294 also engaged with a pulley 296 arranged to be driven by bevel gear connections with the vertical shaft 250. Since the bladed cylinders 2 and 14 are unhairing cylinders they are driven at a somewhat slower speed than the fleshing cylinders 10 and 18.

Means is conveniently provided for collecting the waste material from the various tools which operate on the work. In the illustrated construction, there is provided in connection with the bladed cylinder 2, a trough 300 (Figs. 1, 2, 3, and 4) shown more particularly in Fig. 1 of the drawings. Within this trough 300 there is mounted a feeding screw 302 which is constantly driven in one direction, by a chain and sprocket connection with the cylinder 2, to move the hair and other waste along the trough 300 to one end thereof where it is discharged by means of a spout 304 (Figs. 2 and 4) into the upper end of a chute 306 leading to a receptacle (not shown) at the lower end thereof. As shown most clearly in Figs. 1 and 4 there is provided a trough 310 to receive fleshings from the bladed cylinder 10, said trough 310 being provided with a feed screw 312 operative to move the fleshings to one end of the trough 310 where there is located a spout 314 to discharge the fleshings into a vertical chute 316 separate from the vertical chute 306. Suitably positioned with respect to the bladed cylinder 14 there is provided a trough 318 in which is located a screw 320 for moving hair and other waste material from the cylinder 14 to a spout 322 (Fig. 4) for discharge into the chute 306. In connection with the troughs 300 and 318 there are provided hinged members 321 and 323, respectively, which are lifted by the work on the drums 4 and 16, respectively, and serve as plates over which waste material is pushed and guided into the respective troughs 300 and 318. A somewhat similar hinged member 325 helps to direct waste material into a cover member 327 surrounding the cylinder 10 so that said waste may be carried in the direction of rotation of the cylinder and deposited in the trough 310. Similarly the cylinder 18 has associted therewith a trough 324 in which is located a feed screw 326 operative to move fleshings along the trough to a spout 328 (Fig. 4) discharging into the chute 316. Extending from the neighborhood of the reciprocable cutter 6 is a spout 330 which discharges into a chute 332 leading to a suitable receptacle (not shown). It will be clear that the waste material from each one of the tools is collected and discharged into suitable receptacles, one for fleshings, one for the hair, and the other for the cheekings from the hides or skins.

Means is conveniently provided for supplying water to the drums and to the operating tools with the purpose in mind of keeping both drums and tools in as clean a condition as possible and of facilitating removal of the waste material from the surface of the pieces of work undergoing treatment. As illustrated, the water is supplied to the machine through a supply pipe 340 (Figs. 2 and 4) provided with a shutoff valve at 342. Through a lateral 344 (Figs. 1 and 2) water is supplied to the fleshing cylinder 18, this lateral serving also to wash the waste material from the work undergoing treatment and subsequently from the surface of the drum 20 while the latter is returning empty for a fresh piece of work. A little higher on the supply pipe 340, a lateral 346 supplies water to wash the surface of the drum 16 during movement of the latter to receive a fresh piece of work, a valve 348 being arranged in the path of the drum 16 to be controlled thereby so that water is supplied only at the proper time. Above the lateral 346 is located a lateral 350 which is controlled by a valve having a member 352 arranged in the path of the drum 12 so that the latter may be sprayed while returning for a fresh piece of work. Next above the lateral 350 is a pipe 354 which supplies water continuously to wash the bladed cylinder 14. Higher up is a lateral 356 supplying water continuously to the bladed cylinder 10. As indicated at 358 in Fig. 1, a branch pipe is provided to furnish water for cleaning the surface of the drum 8. Still further up is a lateral 362 provided with a valve and valve lever 364 arranged to be operated by the drum 4 so that water discharges on the surface of the drum during movement of the latter to work receiving position the water being cut off at other times. Adjacent the bladed cylinder 2 is a water pipe 366 extending upwardly from the lateral 362.

The complete treatment of a skin 5 by which it is unhaired, cheeked and fleshed may be readily traced by following it through views 13 to 20, inclusive, beginning with Fig. 17 of the drawings. Actually, these eight views show four different skins on their way through the machine, three of these skins being shown in Fig. 13 and the fourth one as just having been entered into the first drum in Fig. 17. However, since all skins follow the same course, it will be more convenient to assume that one and the same skin is being traced through all the Figs. 13 to 20, inclusive. In Fig. 17, a skin 5 has just been placed by the operator in drum 4 open in work receiving position with the clamp 32 spaced from the drum, Fig. 18 showing the drum 4 catching up with the clamp and pressing the work thereagainst to hold it during treatment by the unhairing cylinder 2, this operation being illustrated as taking place in Figs. 19 and 20. Further rotation of the drum 4 in counterclockwise direction results in completion of the unhairing operation on that part of the skin which rests on the external cylindrical surface of the drum, Fig. 13 also showing the unhaired portion as discharged by gravity into the drum 8 which is open to receive it, the unhaired surface of the skin being indicated by reference character U adjacent thereto. Movement of the drum 8 in a counterclockwise direction results in clamping the work for presentation of the latter to the cheeking knife 6, as indicated in Figs. 14, 15, and 16. Completion of the cheeking operation upon the skin 5 is indicated in Fig. 17 where that portion of the skin has fallen by gravity into the drum 12, open at that instant to receive it, the cheeked surface being indicated by the reference character C adjacent thereto. A moment later (Fig. 18) the drum 12 has closed upon the cheeked portion of the skin 5 and has received upon its external cylindrical surface the unhaired portion of the skin which just previously was resting in the drum 8 (Fig. 17), all as indicated in Fig. 18, which shows the drum 8 just after it has released the unhaired portion of the skin, permitting it to drop upon the external cylindrical surface of the drum 12. Figs. 19 and 20 show fleshing cylinder 10 in operation upon the unhaired portion of the skin resting upon the cylindrical surface of the drum 12. It will be observed upon referring to Fig. 20 that the cylinder 10 is just at the point of finishing its operation on the skin 5. Another 45° turn of the drum 12 brings it to the position shown in Fig. 13 where the skin 5 has just fallen from drum 12 into positions upon the drum 16 and has been clamped upon said drum, it having received up to this time unhairing, cheeking and fleshing treatments, as indicated by the reference characters C, F and U placed, respectively, adjacent to the surfaces so treated. Following now the drum 16 in its operations it will be noticed that the work is presented to the unhairing cylinder 14 (Figs. 14, 15, and 16) which operates upon the surface opposite to the cheeked surface C. Figs. 17 and 18 show the discharge of the skin 5 from the drum 16 to and upon the cylinder 20 for presentation to the fleshing cylinder 18, and Figs. 19 and 20 showing this fleshing operation under way. Completion of the fleshing operation on the part of the skin on the same side on which it was cheeked is indicated in Figs. 13 and 14. It is clear, therefore, that a skin in its passage through the machine is first unhaired upon a portion of the grain surface thereof, next cheeked upon the flesh surface of another half portion thereof, next fleshed upon the portion which was first unhaired, then unhaired on that portion which had been cheeked, and finally fleshed upon that surface which had been cheeked, thus completing the cheeking and two unhairing and fleshing operations.

Having described my invention, what I claim as new and desire to secure by Letters Patent of the United States is:

1. A machine for operating upon sheet material comprising a series of work treating tools, and a series of work supports arranged in alternation with said tools, one work support associated with each tool, each support being constructed and arranged to serve as the sole support for the work during presentation of the work to its associated tool, and each work support being operable to deliver the piece of work following treatment by its associated tool directly to the next work support in the direction of movement of the work.

2. A machine for operating upon hides, skins, and leather comprising a plurality of work treating tools adapted to perform different operations upon opposite sides of a hide, skin, or piece of leather, and work supports constructed and arranged to receive such pieces of work, present them to the work treating tools, and deliver said pieces of work successively from one work support to another in proper positions for treatment by said tools, said tools being operated at substantially higher rates of speed than that of the work supports.

3. A machine for operating upon hides and skins comprising a plurality of work treating tools adapted to perform different beamhouse operations upon opposite sides of a hide or skin, and a plurality of work supports associated with the tools, each work support being movable to present such a piece of work to its associated tool, and operable to deliver said piece of work, following treatment by the tool, in reversed relation to the next work support in the direction of movement of the work.

4. A machine for operating upon hides, skins, and leather comprising a plurality of work treating tools constructed and arranged to operate alternately upon opposite sides of a hide, skin or piece of leather, work supports constructed and arranged to receive such pieces of work, present alternately opposite sides of the pieces of work to the proper work treating tools, and deliver said pieces of work successively from one work support to another, and a guide member associated with each work support to direct the work from one support to another.

5. A machine for operating upon hides, skins, and leather comprising a plurality of work treating tools, a plurality of movable work supports one associated with each work treating tool, each work support having a work clamping surface laterally disposed with respect to its work supporting surface, work clamping members arranged to co-operate with the respective work clamping surfaces of said work supports to maintain control of the hide, skin or leather during its treatment by the work treating tool, and means to operate the work supports and their associated work clamps to deliver such pieces of work from one work support to another in the direction of feed of the work.

6. A machine for operating upon sheet material comprising a plurality of work treating tools, a plurality of movable work supports one associated with each work treating tool, work clamps arranged to co-operate with the respective work supports to maintain control of the piece of work during its treatment by the work treating tool, means to move adjacent work supports and their associated work clamps respectively to work receiving and work delivering positions with relation to each other, and means to effect release of the work by one work clamp after movement of another work clamp to work clamping position while their associated work supports are in the said work receiving and work delivering positions, respectively.

7. A machine for operating upon hides, skins and leather comprising a plurality of bladed tools for operating on said hides, skins, and leather, a plurality of rotary work supports each of which is associated with a bladed work treating tool, each work support being constructed and arranged to serve as the sole support for such piece of work during presentation of the work to its associated tool, and means to operate the work supports to present pieces of work to the work treating tools and to transfer the pieces of work from one work support to the other in the direction of movement of the pieces of work past the work treating tools.

8. A machine for operating upon sheet material comprising a plurality of work treating tools, a plurality of rotary work supports, one associated with each work treating tool, means to drive the tools at substantially higher speeds than that of the work supports, clamping members associated with the respective work supports and each arranged to clamp a piece of work with respect to its associated work support, and means to operate the work supports and the clamping members to present pieces of work to the work treating tools and to transfer the pieces of work from one work support to the other in the direction of movement of the pieces of work past the work treating tools.

9. A machine for operating upon sheet material comprising a plurality of rotary work treating tools, a plurality of work supports one associated with each work treating tool, means to drive the rotary tools at substantially higher speeds than that of the work supports, work holding devices associated with the respective work supports, and means to operate each work support and its work holding device in timed relation to each other and to another work support and its holding device to deliver pieces of work from one work support to the other in the direction of movement of the work past the work treating tools.

10. A machine for operating upon hides, skins, and leather comprising a plurality of work treating tools, a plurality of work supports one associated with each work treating tool, a plurality of devices associated with the respective work supports and each arranged to hold a portion of the work out of work treating position with respect to the associated work treating tool and to clamp the work to its associated work support, means to operate the work supports in timed relation to each other to present a hide, skin or piece of leather to the work treating tools and to position the work supports in reciprocal work delivering and work receiving positions with respect to each other, and means to operate the work holding and clamping devices respectively to deliver and to receive such hide, skin or leather while their associated work supports are in the described work delivering and work receiving positions with respect to each other.

11. A machine for operating upon sheet material comprising a plurality of work treating tools, a plurality of work supports one associated with each work treating tool, means arranged to operate the work supports in timed relation to each other to position the work supports in reciprocal work delivering and work receiving positions with respect to each other, and a plurality of transferring means associated with the respective work supports to deliver pieces of work from one work support to the other while they are in the said work delivering and work receiving positions.

12. A machine for operating upon hides, skins, and leather comprising a plurality of work treating tools, a plurality of work supports one associated with each work treating tool, a plurality of devices associated with the respective work supports and each arranged to hold a portion of the hide, skin or leather not at the time undergoing treatment and to clamp it to its associated work support, means to operate the work supports in timed relation to each other to present such hide, skin or leather to the work treating tools and to position the work supports in reciprocal work delivering and work receiving positions with respect to each other, and means to operate the work holding and clamping devices to effect transfer of a hide, skin or piece of leather from one work support to another while the work supports are in the described work delivering and work receiving positions with respect to each other.

13. A machine for operating upon sheet material comprising a plurality of work treating tools, a plurality of hollow rotary drums, each adapted to receive a portion of the work within the drum and each arranged to present a piece of work to one of the tools, a plurality of work clamping members one associated with each drum to clamp a portion of the work to the drum within the outer cylindrical surface thereof, means to rotate the drums in timed relation to each other constructed and arranged to bring two adjacent drums into work delivering and work receiving position, respectively, with relation to each other, and means to operate the work clamping members of two co-operating drums in such order that a portion of the work is received and clamped by one work clamping member before the work is released by the other work clamping member during transfer of the work from one drum to the other.

14. A machine for operating upon hides, skins, and leather comprising a plurality of work treating tools, a plurality of hollow rotary drums, each arranged to present a hide, skin or piece of leather to one of the tools, a plurality of work clamping members one mounted within each drum, means to rotate the drums in timed relation to each other constructed and arranged to bring two adjacent drums into work delivering and work receiving position, respectively, with relation to each other, and members mounted on the machine frame and arranged to operate the work clamping members of two co-operating drums, respectively, to effect release of the work by one clamping member only after the other clamping member has been operated to clamp the piece of work as it is transferred from one drum to the other.

15. A machine for operating upon hides, skins, and leather comprising a plurality of work treating tools, a plurality of hollow rotary drums, each arranged to receive within the drum approximately one-half of a piece of work and to present the other half of the piece of work to one of the tools, whereby two drums and two tools are required to complete the treatment of one surface of the piece of work, a plurality of work clamping members one associated with each drum, means to rotate the drums in timed relation to each other constructed and arranged to bring two adjacent drums into work delivering and work receiving position respectively with relation to each other, and means to operate the work clamping members of said adjacent drums in timed relation to each other during transfer of the piece of work from one drum to the other.

16. A machine for operating upon sheet material comprising a series of work treating tools adapted to perform different operations upon opposite sides of a piece of work, a series of work supports, each associated with one of the tools and movable to carry a piece of work past its associated tool to effect treatment of the work, means to operate the tools at substantially higher speeds than that of the work supports, and means to operate the work supports to cause transfer of a piece of work from one work support directly to another in the series of work supports, certain of said work supports being operated to reverse the work with respect to its supporting surface, whereby both sides of the piece of work receive treatment from the work treating tools.

17. A machine for operating upon hides, skins, and leather comprising a series of tools adapted to perform different operations upon opposite sides of a hide, skin, or piece of leather, a series of rotary work supports, each associated with one of the tools and each constructed and arranged to carry approximately one half of such piece of work past its associated tool to effect treatment of the work, and positively interconnected means to rotate the work supports in timed relation to each other to effect transfer of a piece of work from one work support directly to another throughout the whole series of work supports whereby a given piece of work is successively treated by the work treating tools until both sides of the piece of work have been treated throughout.

18. A machine for operating upon sheet material comprising a plurality of work treating tools, a plurality of work supports, each associated with one of the tools and movable to carry a piece of work past its associated tool to effect treatment of the work, means to operate the tools at substantially higher speeds than that of the work supports, and positively interconnected gear mechanisms arranged to operate the work supports in fixed relation to each other to cause transfer of a piece of work from one work support to another of the work supports, whereby a piece of work receives treatment successively from the different work treating tools.

19. A machine for operating upon hides, skins, and leather comprising a plurality of bladed tools to treat a hide, skin, or leather, a plurality of work supports, each associated with one of the tools and movable to carry such a piece of work past its associated tool to effect treatment of the work, means to drive the tools at substantially higher speeds than that of the work supports, a shaft, and interconnected gears positively driven by said shaft for operating the work supports in timed relation to each other to effect transfer of a piece of work from one work support directly to another of the work supports, whereby a given piece of work is successively treated by the work treating tools.

20. A machine for operating upon hides and skins comprising a plurality of tools constructed and arranged to unhair, flesh, and cheek hides and skins, a plurality of rotary work supports one associated with each work treating tool, and interconnected gear mechanisms arranged to rotate the work supports in timed relation to each other to bring two adjacent work supports simultaneously into work delivering and work receiving positions, respectively, with relation to each other so that pieces of work are transferred from one work support directly to another in the direction of travel of the work past the work treating tools.

21. A machine for operating upon sheet material comprising a plurality of work treating tools, a plurality of rotary work supports one associated with each work treating tool, positively driven members arranged to rotate certain of the work supports continuously in one direction, positively driven interconnected members arranged to effect rotative movement of certain other of the work supports first in one direction and then in a reverse direction, and positive driving connections between the two sets of driving members to insure perfect timing of the rotative movements of the rotary work supports with respect to each other.

22. A machine for operating upon hides, skins, and leather comprising a plurality of work treating tools, a plurality of rotary work supports one associated with each work treating tool, gear mechanism for rotating certain of the work supports continuously in one direction, gear mechanism for causing rotative movement of certain other of the work supports first in one direction and then in a reverse direction, and positive driving connections between said two gear mechanisms to insure perfect timing of the rotative movements of the rotary work supports with respect to each other.

23. A machine for operating upon hides, skins, and leather, comprising a plurality of tools constructed and arranged to treat a hide or skin or piece of leather, a plurality of hollow rotary drums adapted to support a piece of such work partly within the hollow drum and partly on a cylindrical surface of said drum, each drum being associated with a work treating tool, means to operate the tools at substantially higher speeds than that of the drums, and positively interconnected gear mechanism arranged to rotate the drums in timed relation to each other to bring two adjacent drums simultaneously into work delivering and work receiving positions, respectively, with relation to each other so that pieces of work are transferred from one drum directly to another in the direction of travel of the work past the work treating tools.

24. A machine for operating upon hides, skins, and leather, comprising a plurality of rotary drums, a plurality of tools constructed and arranged to treat a hide, skin, or piece of leather, each tool being associated with one of the rotary drums to co-operate therewith in the treatment of a work piece and the tools and drums being operative in pairs to perform successive operations upon each work piece, positively driven members arranged to rotate certain of the drums continuously in one direction and others of the drums first in one direction and then in a reverse direction, and means to operate the tools at substantially higher speeds than that of the drums.

25. A machine for operating upon hides, skins, and leather, comprising a plurality of work treating tools, a plurality of hollow rotary drums, one associated with each work treating tool, each drum having an internal space for receiving substantially one-half of each piece of work, a plurality of clamping members, each associated with one drum and operative to secure the piece of work temporarily to the drum with another portion of the work resting on the external cylindrical surface of the drum, and means to rotate certain of the drums continuously in one direction and others of the drums first in one direction and then in the reverse direction, said means being operative to rotate the drums in fixed relation to each other in such manner that the drums deliver the work directly from one drum to another in the direction of travel of the work.

26. A machine for operating upon hides, skins, and leather comprising a plurality of work treating tools, a plurality of rotary work supports one associated with each work treating tool and each work support being hollow to receive approximately one-half of each piece of work in turn, a plurality of members one associated with each work support and each mounted within its associated work support and arranged yieldingly to clamp a piece of work with respect to its associated work support, a shaft, interconnected gears driven by said shaft and arranged to rotate the work supports in fixed relation to each other to bring adjacent work supports simultaneously into work delivering and work receiving positions, respectively, with relation to each other, and means controlled by the rotary work supports to operate the clamp members in timed relation to each other so that pieces of work are unclamped from the delivering work support and clamped to the receiving work support as the piece of work is transferred from one work support to another in the direction of travel of the work past the work treating tools.

27. A machine for operating upon hides, skins, and leather comprising a plurality of work treating tools, a plurality of drums one associated with each work treating tool, each drum having an internal space for receiving a portion of each piece of work, a plurality of clamping members one associated with each drum and operative to secure the work temporarily to the drum with another portion of the work resting on an external cylindrical surface of the drum, and means to rotate the drums in timed relation to each other to present pieces of work to the work treating tools, and to deliver pieces of work from one drum to the other in the direction of movement of the work, said drum rotating means being operative also to effect operation of the work clamping members to provide for release of the work from one of the drums and clamping of the work to a succeeding drum.

28. A machine for operating upon hides, skins, and leather comprising a plurality of tools adapted to effect unhairing and fleshing operations upon hides and skins, a plurality of drums one associated with each work treating tool, each drum having an internal space for receiving a portion of each piece of work, a plurality of clamp members one associated with each drum and operative to secure the work temporarily to the drum with another portion of the work resting on an external cylindrical surface of the drum, interconnected gear trains to rotate the drums in fixed relation to each other to present the pieces of work to the work treating tool and to deliver pieces of work from one drum to the other in the direction of movement of the work, and means to effect operation of the work clamping members in timed relation to each other to provide for release of the work from one of the drums and clamping of the work to a succeeding drum.

29. A machine for operating upon sheet material comprising a plurality of work treating tools, a plurality of rotary members associated with the tools and each having a cylindrical surface arranged to present a piece of work to its associated work treating tool, a plurality of devices one associated with each work presenting member to clamp a piece of work to said member, means to operate the work presenting members in timed relation to each other so that a piece of work may be delivered from one work presenting member to another, and a member operated by one of the work presenting members to engage the work while it is in suspended relation to one of the work presenting members, and operative to spread it over the cylindrical surface of another work presenting member.

30. A machine for operating upon sheet material comprising two work treating tools located one above another, two rotary work supports, one associated with each of the tools, clamping members associated with the respective work supports, means to rotate the work supports in timed relation to each other in such manner as to deliver a piece of work from the upper to the lower work support, and a member operated by the lower work support to engage the piece of work while it is suspended from the upper work support into position closely adjacent to the lower work support, said member being also operated to spread the work over the work supporting surface of the lower work support.

31. A machine for operating upon hides, skins, and leather comprising two work treating tools located one above another, two rotary work supports, one associated with each of the tools, clamping members associated with the respective work supports, means to rotate the work supports in timed relation to each other in such manner as to deliver a piece of work from the upper to the lower work support, and a spreader bar operated by the lower work support to engage the piece of work while suspended from the upper work support with a portion thereof adjacent to the lower work support, said spreader bar being operative to spread the work over the work receiving surface of the lower work support.

32. A machine for operating upon hides, skins, and leather comprising a plurality of work treating tools adapted to perform different operations and remove different kinds of waste materials from the work, a plurality of work supports associated with the tools and each constructed and arranged to present the work to its associated tool for treatment and to transfer the work successively from one work support to another in the direction of movement of the work past the work treating tools, a plurality of receptacles one associated with each tool to receive the waste material removed from the piece of work undergoing treatment, and a plurality of members one movable in each receptacle for discharging waste material therefrom.

33. A machine for operating upon hides, skins, and leather comprising a plurality of work treating tools adapted to perform different operations and remove different kinds of waste materials from the work, a plurality of work supports associated with the tools constructed and arranged to present pieces of work to the tools for treatment and to transfer the work pieces successively from one work support to the other in the direction of movement of the work past the work treating tools, a plurality of troughs one extending lengthwise of and in juxtaposition to each tool to receive the waste material removed from the piece of work undergoing treatment, and a plurality of endless screws one movable in each trough for discharging waste material therefrom.

34. A machine for operating upon hides, skins, and leather comprising a work treating tool, a rotary member having a cylindrical surface arranged to present a piece of work to the work treating tool, a device associated with the rotary member to clamp the work to said member, a receptacle located to receive waste removed from a surface of the work by said tool, and a movable member to engage the work spread upon the cylindrical surface of the rotary member and operative to guide waste material toward said receptacle.

35. A machine for operating upon hides, skins, and leather comprising a work treating tool, a rotary work support associated with the tool, means to rotate the work support to feed a piece of work to the tool, a receptacle to receive waste material removed from the work by said tool, and a member pivotally mounted on the receptacle and arranged to engage movably the piece of work while it is spread upon the work supporting surface of the rotary work support, said member being mounted closely adjacent to the tool to receive the waste material therefrom and to guide it toward said receptacle.

GEORGE E. McLAUGHLIN.